(12) United States Patent
Wang

(10) Patent No.: US 8,363,093 B2
(45) Date of Patent: *Jan. 29, 2013

(54) STEREOSCOPIC IMAGING USING SPLIT COMPLEMENTARY COLOR FILTERS

(75) Inventor: Sen Wang, Rchester, NY (US)

(73) Assignee: Eastman Kodak Company, Rochester, NY (US)

( * ) Notice: Subject to any disclaimer, the term of this patent is extended or adjusted under 35 U.S.C. 154(b) by 725 days.

This patent is subject to a terminal disclaimer.

(21) Appl. No.: 12/460,948

(22) Filed: Jul. 27, 2009

(65) Prior Publication Data

US 2011/0018974 A1    Jan. 27, 2011

(51) Int. Cl.
*H04N 15/00* (2006.01)
(52) U.S. Cl. .......................... 348/49; 348/336
(58) Field of Classification Search .................. None
See application file for complete search history.

(56) References Cited

U.S. PATENT DOCUMENTS

| 4,740,833 | A * | 4/1988 | Shiota et al. ............ 358/518 |
| 6,349,174 | B1 * | 2/2002 | Ray et al. ............. 396/106 |
| 6,507,665 | B1 * | 1/2003 | Cahill et al. .......... 382/154 |
| 6,940,547 | B1 * | 9/2005 | Mine ................... 348/241 |
| 7,826,728 | B2 * | 11/2010 | Konno et al. .......... 396/16 |
| 2003/0147002 | A1 * | 8/2003 | Ray et al. ............ 348/370 |
| 2006/0033831 | A1 * | 2/2006 | Ejima et al. ......... 348/333.01 |
| 2006/0092314 | A1 | 5/2006 | Silverstein et al. |
| 2007/0279412 | A1 * | 12/2007 | Davidson et al. ...... 345/419 |
| 2009/0244521 | A1 * | 10/2009 | Yazdanfar et al. ..... 356/73 |
| 2010/0053385 | A1 * | 3/2010 | Choe et al. .......... 348/273 |

FOREIGN PATENT DOCUMENTS

JP    2001-174696    6/2001

* cited by examiner

*Primary Examiner* — Ario Etienne
*Assistant Examiner* — Clayton R Williams
(74) *Attorney, Agent, or Firm* — Kevin E. Spaulding

(57) ABSTRACT

A system for generating a stereoscopic image pair comprising a split color filter with complementary colors located at a stop associated with a lens and configured to split an image of a scene received from the lens into two complementary images having complementary colors, a color image sensor configured to simultaneously receive the two complementary images; and a data processing system configured compute an offset value for each corresponding pixel in the complementary images and generate a stereoscopic full color image pair based upon an analysis of the complementary images and the offset values.

25 Claims, 9 Drawing Sheets

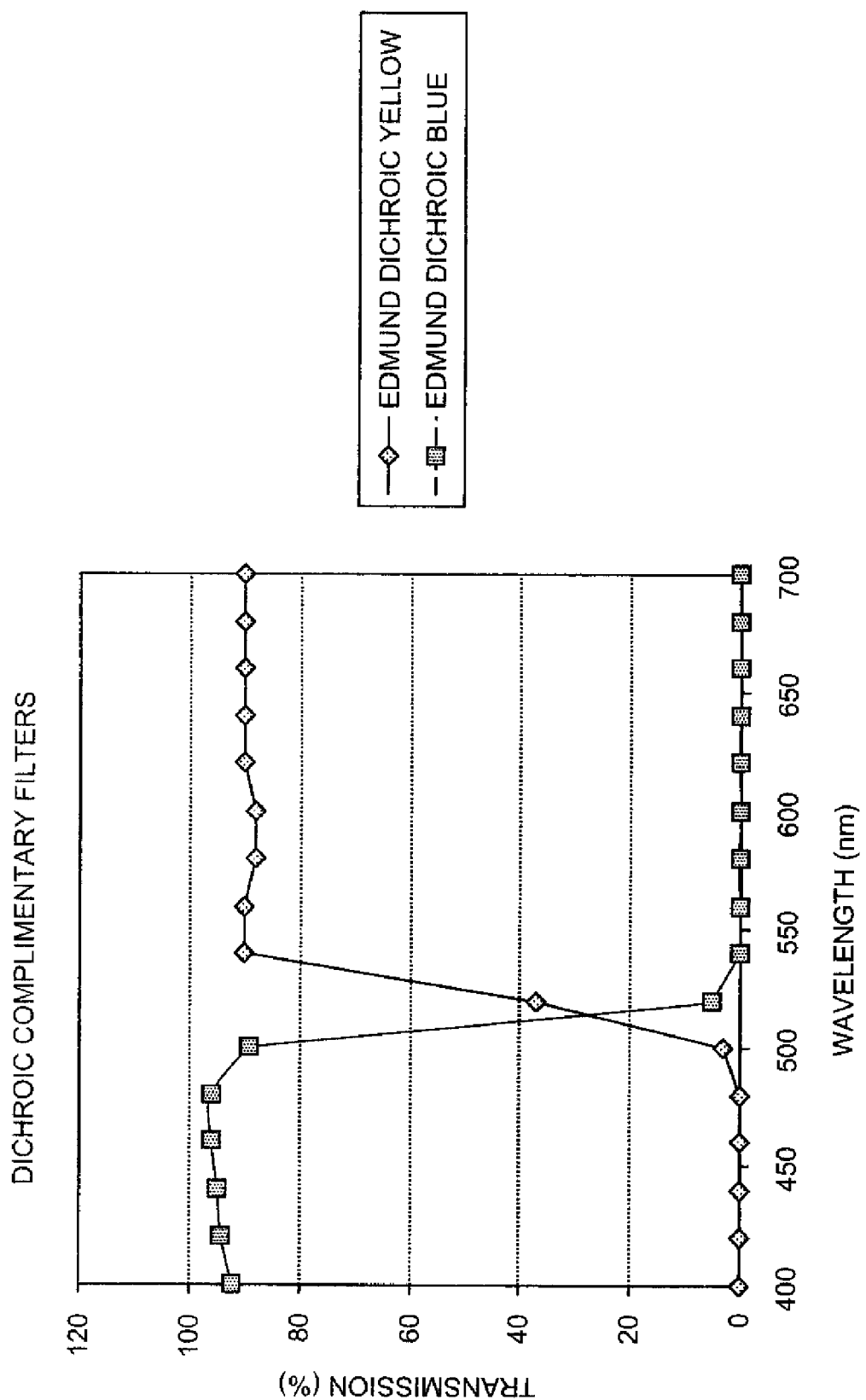

| B | U | B | U |
|---|---|---|---|
| L | R | L | R |
| B | U | B | U |
| L | R | L | R |

FIG. 8B

| R | G | R | G |
|---|---|---|---|
| G | B | G | B |
| R | G | R | G |
| G | B | G | B |

FIG. 8A
(PRIOR ART)

STEREOSCOPIC IMAGING USING SPLIT COMPLEMENTARY COLOR FILTERS

CROSS-REFERENCE TO RELATED APPLICATIONS

Reference is made to commonly assigned, co-pending U.S. Patent Application Publication No. 2009/0219432, entitled: "Sensor with Multi-Perspective Image Capture", by Russell Palum, et al., U.S. Patent Application Publication No. 2010/0103276, entitled: "Split Aperture Capture of Rangemap for 3D Imaging", by John Border, and U.S. Patent Application Publication Serial 2011/0018993, entitled 'Ranging Apparatus using Split Complementary Color Filters", by Shen Wang et al.

FIELD OF THE INVENTION

The present invention relates to the generation of stereoscopic image pairs, and more particularly to a method for generating stereoscopic image pairs from images captured with split complementary color filters.

BACKGROUND OF THE INVENTION

Methods for distance estimation to regions in a scene during image capture can be divided into two main approaches: active and passive. Active approaches involve additional energy sources such as illumination sources to determine the distance to objects in the scene. These additional energy sources substantially increase the energy required for capture. In contrast, passive approaches determine the distance to objects in the scene by analysis of changes of viewpoint or focus without using additional illumination sources and as such are more energy efficient.

In a first class of passive depth estimation methods, multiple viewpoints are obtained by capturing multiple images as in stereovision. Alternately, multiple viewpoints can be captured simultaneously by positioning a lenticular array over an image sensor as described in U.S. patent application Ser. No. 12/040,274, entitled "Sensor with Multi-perspective Image Capture." In another method, images with different perspectives can be captured by alternately blocking half of the aperture of the lens of the image capture device as disclosed in U.S. patent application Ser. No. 12/259,348, entitled "Split Aperture Capture of Rangemap for 3D Imaging." In each of these methods, depth is estimated by comparing the relative locations of objects in the multiple images and determining the distance to the objects by triangulation.

In a second class of passive depth acquisition methods, depth is estimated by comparing the focus quality for objects in multiple images that were captured from a single viewpoint using multiple focus settings where the lens is focused at different depths. However, these first and second classes of passive depth estimation methods all require multiple images to be captured and compared to estimate depth, thus increasing the computational complexity and increasing the processing time required.

A split color filter system is another version of triangulation that can be used to estimate depth in an image of a scene. In a split color filter system, a split color filter is inserted into the optical path of the lens at the aperture position thereby creating 2 optical paths with different perspectives. The split color filter is constructed so that the filter area is divided into at least two different areas with different colors (typically red and blue) in each area. Two images are then captured simultaneously as a first image formed with light passing through one side of the filter is overlaid on top of a second image formed with light passing through the other side of the filter. Since the first and the second images have different colors, they can be differentiated in the overlaid image. Any defocused regions present in the image have an offset between the two colored images due to the different perspectives of the two optical paths, which then shows up as color fringes on either side of the object in the image. Changing the focus distance of the lens reduces or enlarges the color fringes in the image depending on the distance from the defocused region to the focus distance. When an object in the image is well focused, the color fringes disappear. When an object is defocused inside of the focal distance, the fringes are one color on one side of the object and the other color on the other side of the object in the image. When an object is defocused outside of the focal distance, the colors of the color fringes are reversed. Consequently, with this approach, one image taken with the split color filter delivers an image that can be analyzed to estimate the depth of objects in the scene based on the size and orientation of the color fringes on either side of the objects in the image.

A split color filter system for autofocus is described by Keiichi in the Japanese Patent Application 2001-174696 where a red and blue split color filter is used. Another autofocus system using a color filter with multiple apertures is presented in U.S. Patent Application Publication 2006/0092314. In this disclosure, a color filter with two or three different single colors (red, green, and blue) at the aperture creates two or three overlaid images of different colors (red, green, and blue) on the sensor. All these methods based on split color filters for auto-focus introduce an added complexity by altering the color of the images in the different optical paths for each color filter.

In U.S. Patent Application Publication 2008/0247670, a sparse depth map is built using edge analysis to render stereoscopic images. To enable all of these techniques to be used for image capture and stereoscopic image pair generation where color accuracy is important, this alteration in color of the image must be corrected during or after the image capture so that an image can be produced with accurate color makeup within the image.

A need exists for a method to generate stereoscopic image pairs in a scene from a single image capture with a single lens without a substantial loss of image quality or a substantial loss of color accuracy.

SUMMARY OF THE INVENTION

The present invention represents a system for generating a stereoscopic image pair comprising:
  a lens;
  a split color filter with complementary colors located at a stop associated with the lens and configured to split an image of a scene received from the lens into two complementary images having complementary colors;
  a color image sensor configured to simultaneously receive the two complementary images; and
   a data processing system configured at least to:
    compute an offset value for each corresponding pixel in the complementary images based at least upon an analysis of the complementary images; and
    generate a stereoscopic full color image pair based at least upon an analysis of the complementary images and the offset values.

The present invention has the advantage that it provides a way for generating a stereoscopic image pair from a single image capture. This system can also generate a series of stereoscopic image pairs for a video sequence in real-time which can be displayed on 3D display devices.

It has the further advantage that the stereoscopic image pairs are generated without additional user requirements and without loss of image quality.

It has the additional advantage that the stereoscopic image generation system is portable and can be produced with only minor modifications to conventional digital camera systems.

BRIEF DESCRIPTION OF THE DRAWINGS

FIG. 6 is a graph of the light transmission through a split color filter with yellow and blue sides;

FIG. 7 is a graph of the light transmission through a split color filter with a first side that allows an upper half of the visible spectrum to pass through and a second side that allows a lower half of the visible spectrum to pass through;

FIG. 8A is a schematic diagram of a prior art Bayer color filter array; and

FIG. 8B is a schematic diagram of a color filter array in an embodiment of the invention;

DETAILED DESCRIPTION OF THE INVENTION

The present invention will be illustrated herein in conjunction with particular embodiments of image capture devices, digital cameras, lenses and image sensors. It should be understood, however, that these illustrative arrangements are presented by way of example only, and should not be viewed as limiting the scope of the invention in any way. Those skilled in the art will recognize that the disclosed arrangements can be adapted in a straightforward manner for use with a wide variety of other types of image capture devices, digital cameras, lenses and image sensors.

Figure 1:
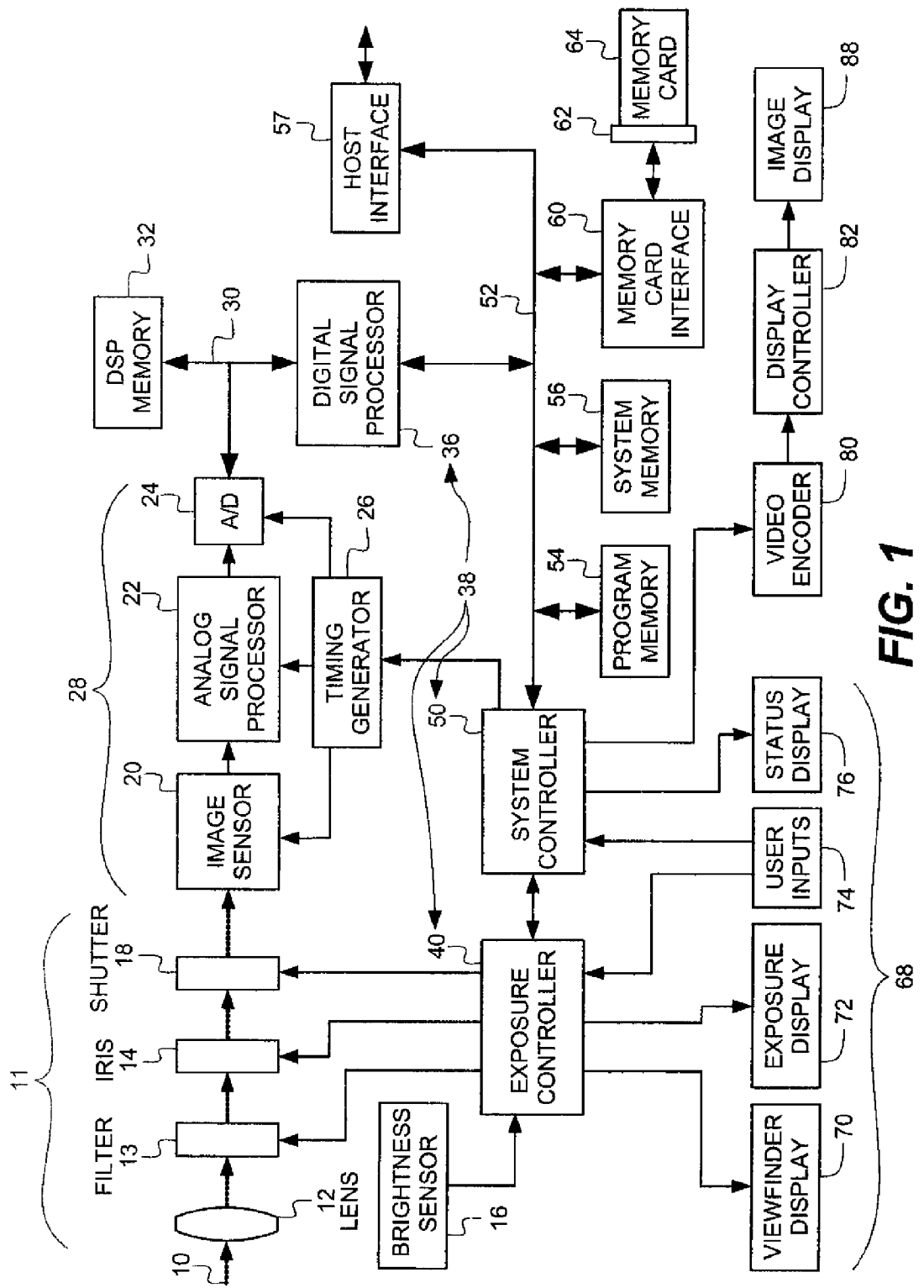
FIG. 1 is a block diagram of a camera system including a split channel complementary color filter in accordance with an embodiment of the present invention.

Turning now to FIG. 1, a block diagram of an image capture device, shown as a digital camera, embodying the present invention is shown. Although a digital camera will now be explained, the present invention is clearly applicable to other types of image capture devices. In the disclosed digital camera, incoming light 10 from the subject scene is input to an imaging stage 11, where the light is focused by lens 12 to form an image on solid state image sensor 20. Image sensor 20 converts the incident light to an electrical signal for each picture element (pixel). The image sensor 20 of the preferred embodiment is a charge coupled device (CCD) type or an active pixel sensor (APS) type (APS devices are often referred to as CMOS sensors because of the ability to fabricate them in a Complementary Metal Oxide Semiconductor process). Pixels on the image sensor 20 have color filter arrays (CFAs) applied over the pixels so that each pixel senses a portion of the imaging spectrum. Examples of the CFA patterns of pixels are shown in FIGS. 8A and 8B although other patterns are used within the spirit of the present invention.

The light passes through the lens 12 and the filter 13 before being sensed by the image sensor 20. Optionally, the light passes through a controllable iris 14 and a mechanical shutter 18. The filter 13 of the invention comprises a split color filter as will subsequently be described in detail along with an optional neutral density (ND) filter for imaging brightly lit scenes. The exposure controller block 40 responds to the amount of light available in the scene as metered by the brightness sensor block 16 and regulates the operation of the filter 13, the iris 14, the shutter 18 and the integration time of the image sensor 20 to control the brightness of the image as sensed by the image sensor 20.

This description of a particular camera configuration will be familiar to one skilled in the art, and it will be obvious that many variations and additional features are present. For example, an autofocus system can be added, or the lenses can be detachable and interchangeable. It will be understood that the present invention is applied to any type of digital camera, where similar functionality is provided by alternative components. For example, the digital camera can be a relatively simple "point-and-shoot" digital camera, where the shutter 18 is a simple movable blade shutter, or the digital camera can be a digital single lens reflex camera where the shutter 18 is a more complicated focal plane shutter arrangement. The present invention can also be practiced on imaging components included in simple camera devices such as mobile phones and automotive vehicles which can be operated without controllable irises 14 and without mechanical shutters 18. The lens 12 of the invention can be a fixed focal length lens or a zoom lens.

The analog signal from image sensor 20 is processed by analog signal processor 22 and applied to analog to digital (A/D) converter 24. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The components of image sensor stage 28 can be separately fabricated integrated circuits, or they can be fabricated as a single integrated circuit as is commonly done with CMOS image sensors. The resulting stream of digital pixel values from A/D converter 24 is stored in digital signal processor (DSP) memory 32 associated with digital signal processor (DSP) 36.

Digital signal processor 36 is one of three processors or controllers in this embodiment, in addition to system controller 50 and exposure controller 40. Although this partitioning of camera functional control among multiple controllers and processors is typical, these controllers or processors can be combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor can be designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in the DSP memory 32 according to a software program permanently stored in program memory 54 and copied to memory 32 for execution during image capture. DSP 36 can be used to execute the software necessary for practicing the image processing of the invention as will be described with reference to FIG. 3. DSP memory 32 includes any type of random access memory, such as SDRAM. A bus 30 comprising a pathway for address and data signals connects DSP 36 to its related DSP memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, filter 13, iris 14, and shutter 18 as previously described, directing the timing generator 26 to operate the image sensor 20 and associated elements, and directing DSP 36 to process the captured image data. After an image is captured and processed, the final image file stored in DSP memory 32 is transferred to a host computer via host interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high speed connection to a personal computer (PC) or other host computer for transfer of image data for display, storage, manipulation or printing. This interface can be an IEEE1394 or USB2.0 serial interface or any other suitable digital interface. Memory card 64 is typically a Compact Flash (CF) card inserted into socket 62 and connected to the system controller 50 via memory card interface 60. Other types of storage that are utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

The user interface 68, including all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touch screens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. It is therefore possible for digital still cameras to have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that are possible and are selected to reduce the cost, add features or improve the performance of the camera.

The image sensor 20 shown in FIG. 1 typically includes a two-dimensional array of light sensitive pixels fabricated on a silicon substrate that provides a way of converting incoming light at each pixel into an electrical signal that is measured. As the sensor is exposed to light, free electrons are generated and captured within the electronic structure at each pixel. Capturing these free electrons for some period of time and then measuring the number of electrons captured, or measuring the rate at which free electrons are generated measures the light level at each pixel. In the former case, accumulated charge is shifted out of the array of pixels to a charge to voltage measurement circuit as in a charge coupled device (CCD), or the area close to each pixel can contain elements of a charge to voltage measurement circuit as in an active pixel sensor (APS or CMOS sensor).

Whenever general reference is made to an image sensor in the following description, it is understood to be representative of the image sensor 20 from FIG. 1. It is further understood that all examples and their equivalents of image sensor architectures and pixel patterns of the present invention disclosed in this specification can be used for image sensor 20.

In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values.

Figure 4A:
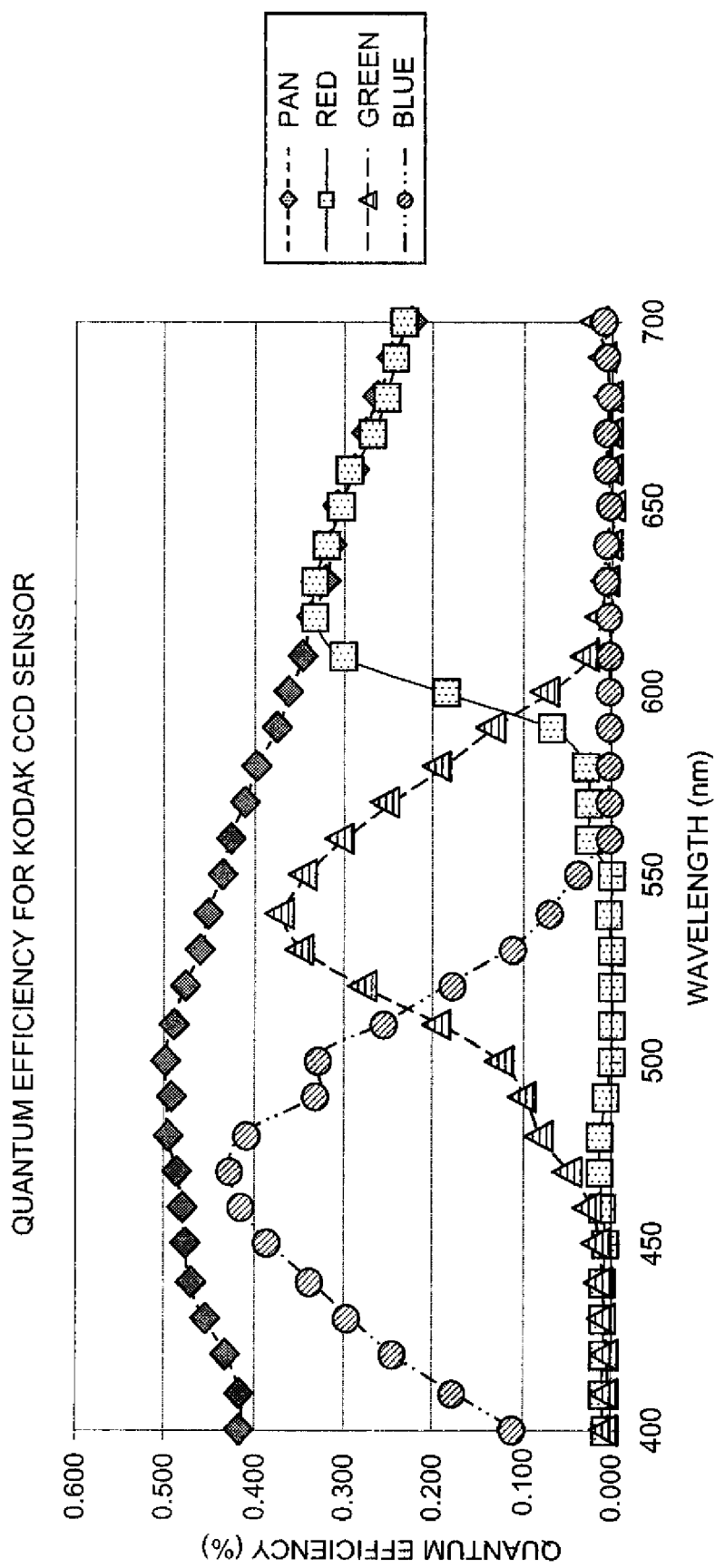
FIG. 4A is a graph of the quantum efficiency for different pixels on a color image sensor.

In order to produce a color image, the array of pixels in an image sensor typically has a pattern of color filters placed over them. FIG. 8A shows a pattern of red (R), green (G), and blue (B) color filters that is commonly used in the prior art. This particular pattern is commonly known as a Bayer color filter array (CFA) after its inventor Bryce Bayer as disclosed in U.S. Pat. No. 3,971,065. Each pixel in the image sensor has a particular color photoresponse. In this case, the pixels have a predominant sensitivity to red, green or blue light. Typical red, green and blue photoresponses for a color image sensor are shown in FIG. 4A.

Other useful varieties of image sensors include pixels having color photoresponses with a predominant sensitivity to magenta, yellow, or cyan light. In each case, the particular color photoresponse has high sensitivity to certain portions of the visible spectrum, while simultaneously having low sensitivity to other portions of the visible spectrum. The term color pixel will refer to a pixel having a color photoresponse.

The set of color photoresponses selected for use in an image sensor usually has three colors, as shown in the Bayer CFA shown in FIG. 8A, but it can also include four or more colors. Some image sensors include panchromatic pixels having a panchromatic photoresponse with high sensitivity across the entire visible spectrum as shown in FIG. 4A. The term panchromatic pixel will refer to a pixel having a panchromatic photoresponse. Panchromatic pixels generally have a wider spectral sensitivity than color pixels, and therefore will have a higher overall sensitivity.

Figure 2:
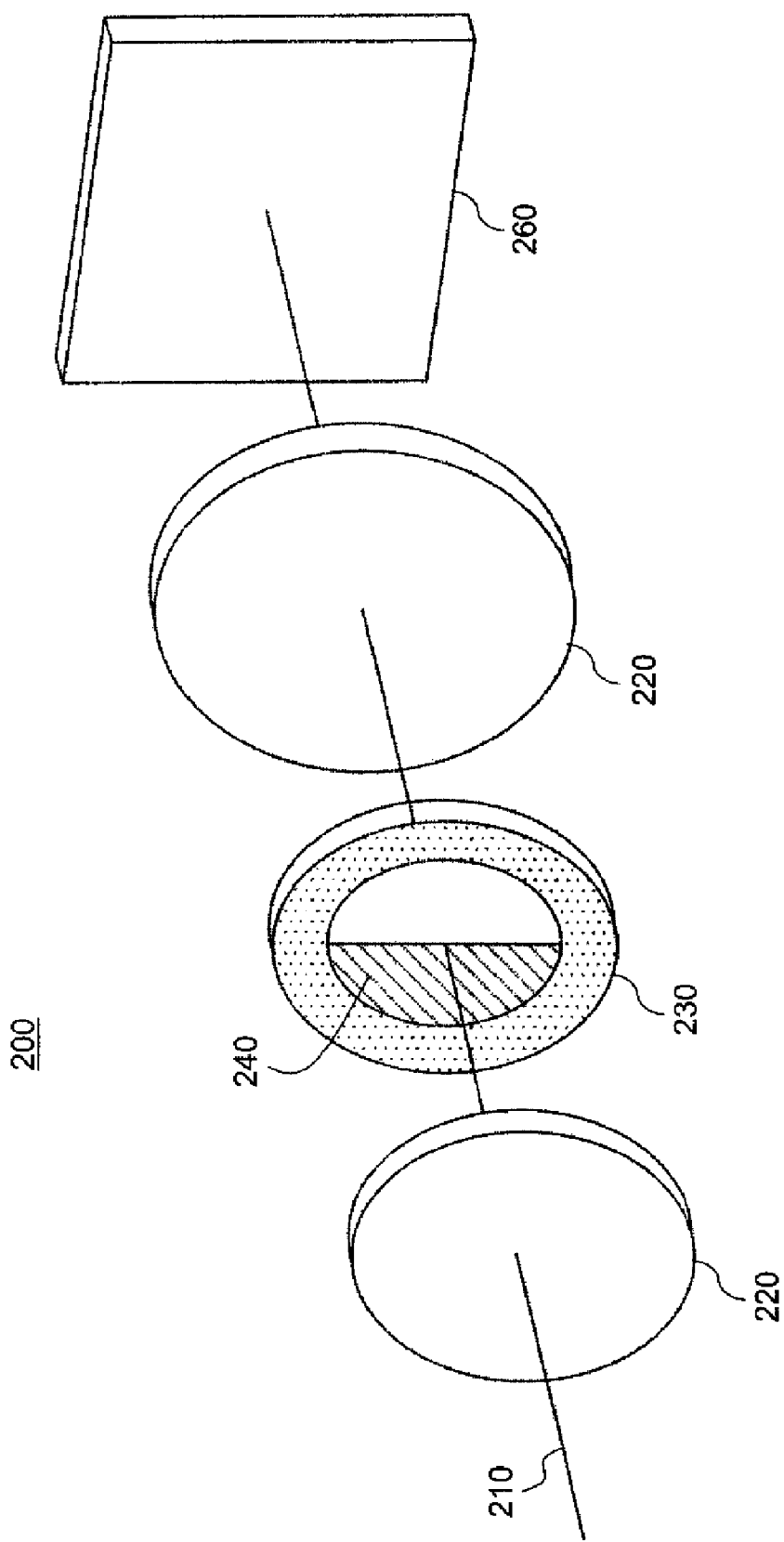
FIG. 2 is a schematic diagram of a split color filter imaging system in an embodiment of the present invention.

A schematic diagram of a split color filter imaging system 200 is shown in FIG. 2. The split color filter imaging system 200 is comprised of a lens assembly 220, a split color filter 240, an aperture stop 230 and an image sensor 260. The lens assembly 220, the split color filter 240, the aperture stop 230 and the image sensor 260 share a common optical axis 210. The lens assembly 220 can be a fixed focal length lens or a zoom lens. The split color filter 240 is comprised of two color filters which each occupy approximately half of the aperture area. The two color filters filter different portions of the electromagnetic spectrum received by the image sensor 260. Each of the two color filters of the split color filter device 240 provides an image to the image sensor 260 within the portion of the electromagnetic spectrum that passes through the respective half of the split color filter 240. Since the respective halves of the split color filter 240 are offset from each other, the images provided by the respective halves of the split color filter 240 have different perspectives forming a stereo image pair wherein the perspectives of the images are separated by approximately 0.4× the diameter of the aperture of the lens. Because the two images from the respective halves of the split aperture 240 are provided to the image sensor 260 simultaneously, the colors sensed by the image sensor are the combination of the two images in regions where the two images are matched. However, in regions where the different perspectives in the two images provide different image information, the colors in those regions are not aligned and as such the two images will be offset from each other providing colored fringes around objects in the image. It is these image offsets that provide a method for estimating the distance to objects in a scene from the image as sensed by the image sensor 260.

Figure 3:
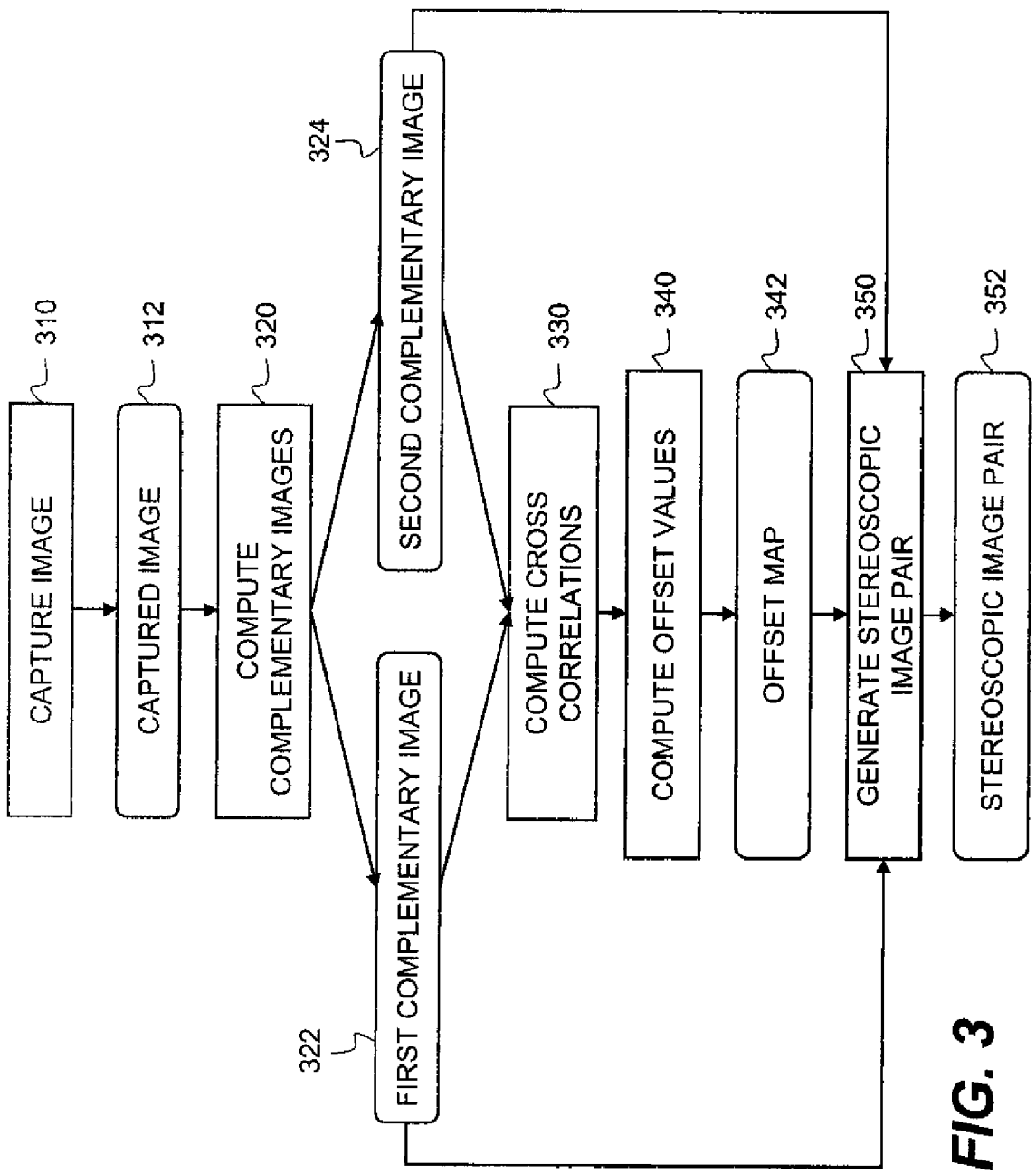
FIG. 3 is a flow chart that illustrates a method for generating a stereoscopic image pair in accordance with the present invention.

FIG. 3 illustrates a method for stereoscopic image generation in an image capture device using a split color filter imaging system as shown in FIG. 2 in accordance with an embodiment of the present invention. For illustrative purposes only, and not to be limiting thereof, the method of FIG. 3 is discussed in the context of the system embodiment in FIG. 1. In capture image step 310, the capture button is pushed by the operator to initiate capture of a captured image 312 from image sensor 20. In a preferred embodiment of the present invention, the captured image 312 has been processed using a CFA interpolation algorithm so that color values for each color channel are available at each pixel location. Alternatively, the method of the present invention can be applied directly to the pixel values in the captured CFA image. However, in this case, it will be necessary to account for the fact that the pixels in each of the color channels are not aligned. Captured image 312 can be used to produce stereoscopic still images or stereoscopic video image sequences. Alternately, captured image 312 can also be processed to produce conventional image or video.

In compute complementary images step 320, the captured image 312 is split into a first complementary image 322 and a second complementary image 324 corresponding to the colors of the split color filter 240 (FIG. 2), such as for example red and cyan. The first and second complementary images 322 and 324 can be still images or alternatively can be image frames extracted from a video sequence.

When the color channels of the image sensor 260 do not match the colors of the split color filter 240, the first and second complementary images 322 and 324 can be computed by appropriate combinations of the color channels in the captured image 312 to form a synthetic color channel. For example, consider the case where the image sensor 260 has pixels with red green and blue photoresponses and the split color filter 240 has red and cyan filters. In this case, the red pixel values in the captured image 312 can be used directly to form the first complementary image 322 corresponding to the red color filter. However, since the image sensor 260 does not have pixels with a cyan spectral response, it is necessary to combine the green and blue pixel values in the captured image 312 to form a synthetic cyan color channel corresponding to the cyan color filter to use for the second complementary image 322. In a preferred embodiment of the present invention, the synthetic cyan pixel values C are computed according to the following equation:

$$C = w_1 \cdot G + w_2 \cdot B$$

where G and B are the green and blue channel pixel values of the captured image 312, respectively, and $w_1$ and $w_2$ are two weight parameters. The values of the two weight parameters $w_1$ and $w_2$ can be determined to provide the best match between the spectral response of the cyan filter and the effective spectral response of the synthetic cyan color channel.

Next, compute cross correlations step 330 is used to cross correlate the first complementary image 322 and the second complementary image 324. In this step, normalized cross-correlation functions are determined for each image pixel. The normalized cross-correlation functions are computed using image blocks of size k×l pixels. The image blocks are translated around each pixel in an area of size m×n pixels to determine normalized cross-correlation functions of size m×n for each image pixel.

Next, compute offset value step 340 determines an offset map 342, which represents an offset value for each image pixel by determining the highest correlation value in the normalized cross-correlation function for that image pixel. Generally, the compute offset value step 340 is computed after the application of a noise reduction algorithm such as a graph cut algo§rithm or a Gaussian smooth algorithm. The offset values can also be used to generate a range map which represents the distances to regions in a scene.

Next, a generate full-color stereoscopic image pair step 350 is used to generate a full-color stereoscopic image pair 352 from the offset map 342, together with the first complementary image 322 and the second complementary image 324. The stereoscopic image pair 352 is comprised of a full-color right-side image and a full-color left-side image. The full-color right-side image of the stereoscopic image pair 352 is generated by shifting image pixels from the first complementary image 322 onto corresponding image pixels from the second complementary image 324 using the corresponding offset values in the offset map 342. For example, if the first complementary image 322 is red complementary image and the second complementary image 324 is a cyan complementary image, the pixels of the red complementary image can be shifted to form a shifted red complementary image. The full color right-side image can then be formed by combining the red pixel values from the shifted red complementary image with the green and blue pixel values from the cyan complementary image. Similarly, the full-color left-side image of the stereoscopic image pair 352 is generated by shifting image pixels from the second complementary image 324 onto corresponding image pixels from the first complementary image 322 using the corresponding offset values in the offset map 342. For the case of embodiments using CFA image sensors where the preceding steps are applied to the uninterpolated pixels of the CFA image, full-resolution full-color left- and right-side images can be produced by applying a conventional CFA interpolation algorithm as is well known in the art.

Figure 4B:
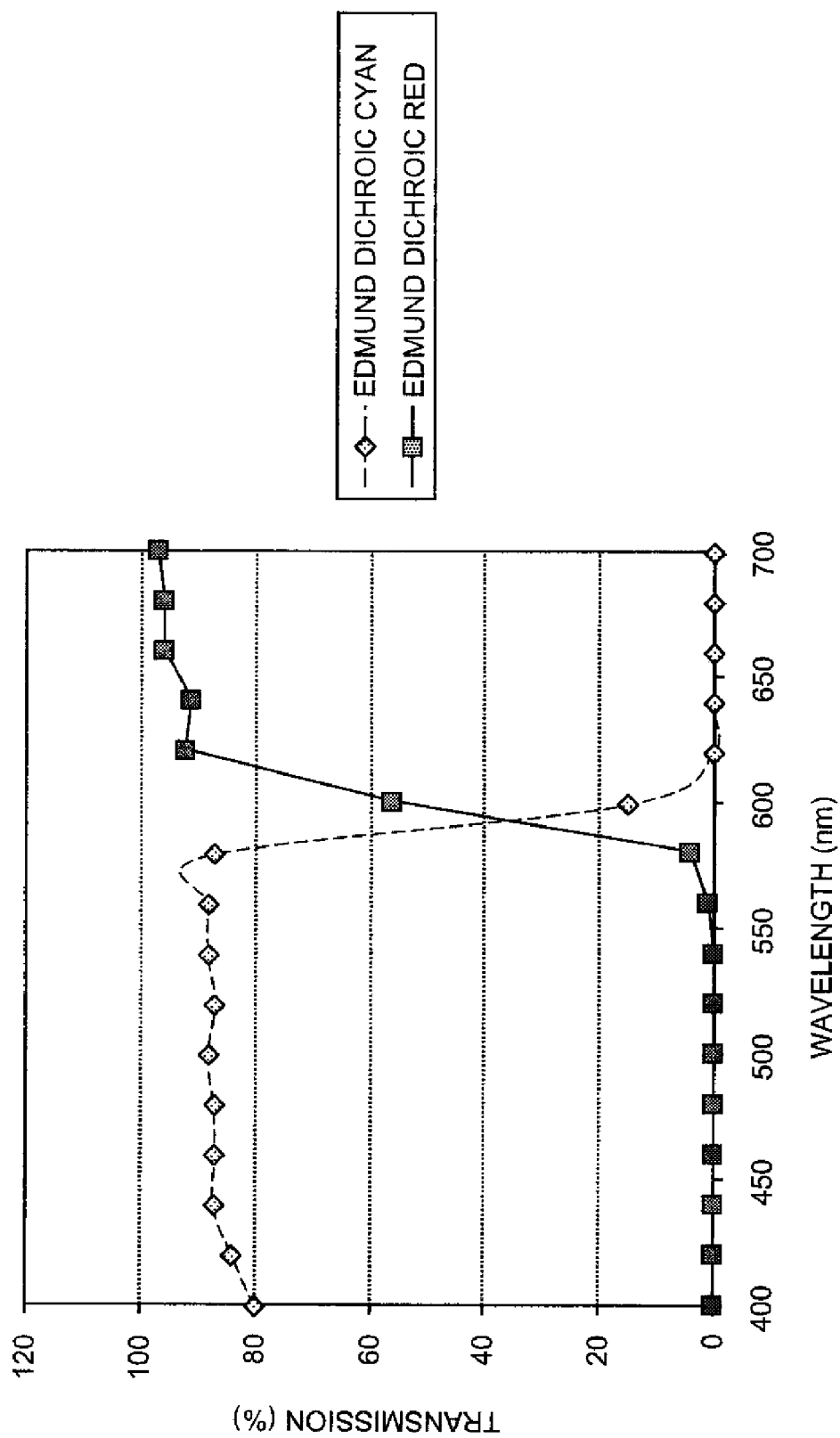
FIG. 4B is a graph of the transmission through a split color filter with cyan and red sides.

FIG. 4B shows a graph of transmission vs. wavelength for the two sides of a split color filter 240 as an example embodiment of the invention. For this example, one half of the split color filter 240 allows cyan light to pass while the other half of the split color filter 240 allows red light to pass. In this way, the split color filter 240 provides two optical paths comprised of cyan and red light respectively wherein the two optical paths are separated by a distance due to the different locations of their respective halves in the aperture 230 such that different perspectives are provided by the two optical paths. By providing two optical paths with two different split color filter halves, areas in the captured image where the different perspectives of the two optical paths produce regions in the image where the images from the two optical paths do not overlap so that range information can be obtained.

In a preferred embodiment of the present invention, the halves of the split color filter are chosen to provide complementary color filtering. Complementary color filtering comprises two color filters which together allow substantially all the light in the visible spectrum to pass through the combined two halves of the split color filter. For the case shown in FIG. 4B, one half of the split color filter 240 allows light below approximately 600 nm to pass through the filter to the image sensor 260 while the other half of the split color filter allows light approximately above 600 nm to pass through the filter to the image sensor 260. Using complementary color filters in the split color filter, allows for clear separation of the two images while maximizing the available visible light that is allowed to pass through to the image sensor, thereby increasing the sensitivity of the imaging system. This case of cyan and red color filters in the split color filter is well suited for use with a Bayer type imaging sensor since the pixels are sensitive to red, green and blue so that the red pixels receive the image from the red filter and the green and blue pixels receive the image from the cyan filter.

Figure 5C:
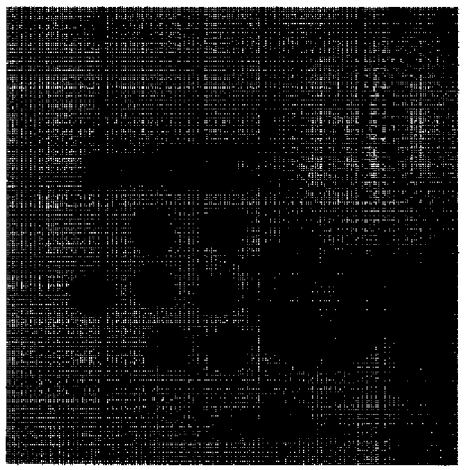
FIG. 5C illustrates a cyan image computed from the green and blue channels.
Figure 5F:
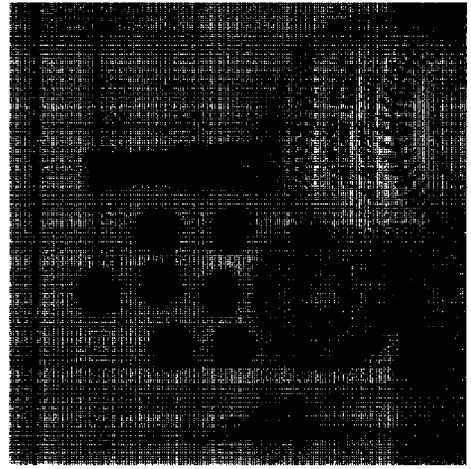
FIGS. 5E and 5F illustrate a stereoscopic image pair generated using the method of the present invention.
Figure 5B:
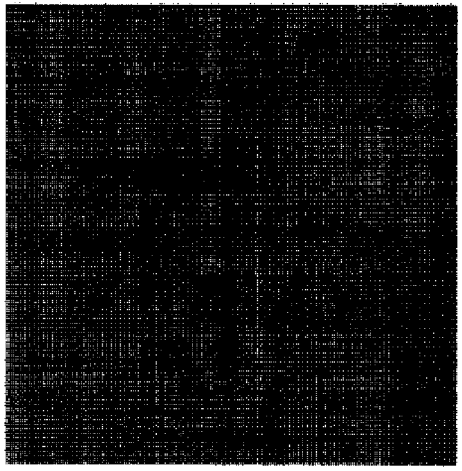
FIG. 5B illustrates an image extracted from the red channel.
Figure 5E:
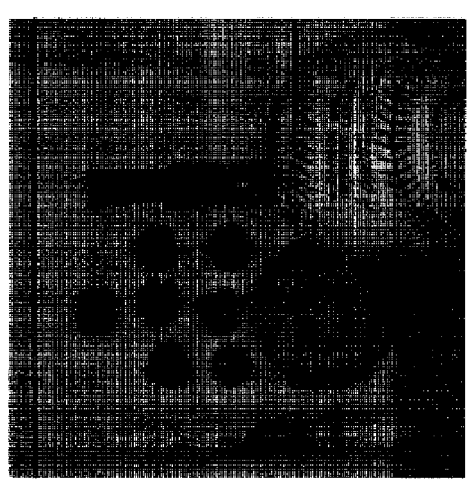
Figure 5A:
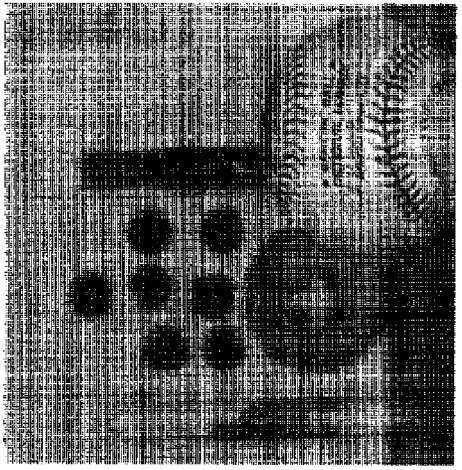
FIG. 5A illustrates an original image captured with a split color filter.
Figure 5D:
FIG. 5D illustrates an offset map computed from the images shown in FIGS. 5B and 5C using the method of the present invention.

FIGS. 5A-5F show a series of images that illustrate the method of one embodiment of the invention using the method shown in FIG. 3 and described previously, with a split color filter imaging system as shown in FIG. 2 with complementary color filters as shown in FIG. 4B. FIG. 5A shows an example image as captured in capture image step 310 by a split color filter imaging system wherein the split color filter includes red and cyan filters and a Bayer imaging sensor. FIGS. 5B and 5C illustrate the first complementary image 322 and the second complementary image 324, respectively, produced in compute complementary images step 320. FIG. 5B illustrates a red image produced from the red pixels on the image sensor and as such containing the red portion of the image shown in FIG. 5A. FIG. 5C illustrates a cyan image computed from the green and blue pixels on the image sensor and as such containing the green and blue portions of the image shown in FIG. 5A. FIG. 5D illustrates the computed offset map 352 as produced in compute offset map step 350, where darker colors indicate objects which are located nearer to the image capture device than light colored objects which are located farther from the image capture device. FIGS. 5E and 5F illustrates the generated full-color left-side image and the full-color right-side image of the full-color stereoscopic image pair 352, respectively.

FIG. 6 shows spectral transmittances for split color filter 240 according to an alternate embodiment of the invention. In this case, the split color filter 240 includes blue and yellow filters. (Filters of the type shown can be obtained at Edmund Optics as dichroic filters that provide blue and yellow light respectively.) The yellow filter transmits both the red and green light. This embodiment is also suited to image sensors which have red, green and blue pixels such as for example the Bayer color filter array shown in FIG. 8A or others which include red, green and blue pixels or red, green, blue and panchromatic pixels. In this case, the first complementary image 322 is based on the blue pixels of the image sensor while the second complementary image 324 is computed from the green and red pixels of the image sensor, and range map 352 is produced by cross-correlating the blue image with the yellow image.

In yet another embodiment of the invention, a monoscopic full color still image or video is generated. The split color filter still remains in the optical path during the capture of the full color image, therefore producing two complementary images as described earlier. To form a sharp full color image, the two complementary images are overlaid and aligned with each other. Alignment of the two images is accomplished by shifting the image pixels in one of the complementary images relative to the other complementary image based on the offset map 342. The pixel values of the two complementary images are then combined to form a monoscopic full color image. For example, if the complementary images are comprised of a red complementary image and a cyan complementary image, the pixels of the red complementary image can be shifted to form a shifted red complementary image. The monoscopic full color image can then be formed by combining the red pixel values from the shifted red complementary image with the green and blue pixel values from the cyan complementary image. For the case of embodiments using CFA sensors with red, green and blue pixels where the preceding steps are applied to the uninterpolated CFA pixels, a full-resolution full-color image can be produced by applying a conventional CFA interpolation algorithm as is well known in the art.

Figure 7:
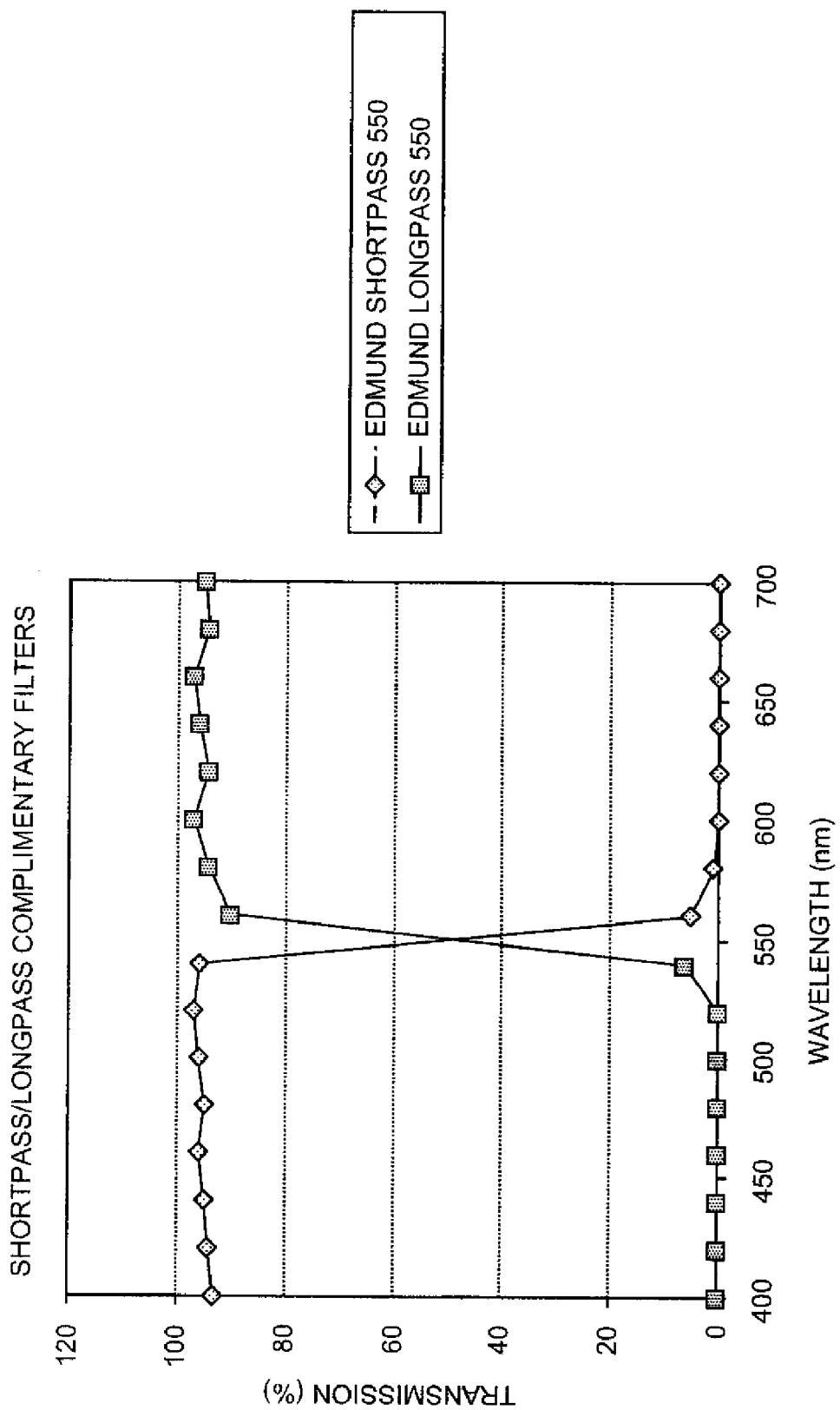

FIG. 7 shows spectral transmittances for split color filter 240 according to yet another embodiment of the present invention. In this split color filter 240, the colors in the filter divide the visible spectrum into substantially even upper and lower halves of the visible spectrum. By dividing the spectrum into substantially even upper and lower halves of the visible spectrum, a balanced sensitivity of visible light in the scene is provided to the image sensor. Color filters of the type shown in FIG. 7 can be obtained from Edmund Optics as shortpass and long pass filters respectively that allow light to pass through the filter half below or above 550 nm respectively. Color filter array patterns that are suited for use with a split color filter which has the spectrum response shown in FIG. 7 are shown in FIGS. 8B. In this figure, pixels that respond to the upper half of the visible spectrum as denoted by U while pixels which respond to the lower half of the visible spectrum are denoted by L. In the case of an image captured with an image sensor as shown in FIG. 8B, the first complementary image 322 is produced from the B and L pixels while the second complementary image 324 is produced from the R and U pixels. The offset map 342 is then produced by cross-correlating the first complementary image 322 to the second complementary image 324.

Color information for the full color image is provided by subtracting narrow spectral pixel values from wide spectral pixel values to produce red, green and blue pixel values. To form a sharp full color image from the image captured with a split color filter as shown in FIG. 7, the two images produced from the B and L pixels and the R and U pixels must be aligned based on the shift values as described previously. Then, pixel values are computed for the L and U pixels by subtracting the B and R values from neighboring pixels to form lower green and upper green pixel values. A full color image can then be produced by interpolating the pixel values from the B, lower green, upper green and R pixel values for their respective pixels as is well known in the art.

The invention has been described in detail with particular reference to certain preferred embodiments thereof, but it will be understood that variations and modifications can be effected within the spirit and scope of the invention.

PARTS LIST

10 Incoming light
11 Imaging stage
12 Lens
13 Filter
14 Iris
16 Brightness sensor
18 Shutter
20 Image sensor
22 Analog signal processor
24 Analog to digital converter
26 Timing generator
28 Image sensor stage
30 Bus
32 Digital signal processor memory
36 Digital signal processor
38 Processing stage
40 Exposure controller
50 System controller
52 Bus
54 Program memory
56 System memory
57 Host interface
60 Memory card interface
62 Socket
64 Memory card
68 User interface
70 Viewfinder display
72 Exposure display
74 User inputs
76 Status display
80 Video encoder
82 Display controller
88 Image display
200 Split color filter imaging system
210 Optical axis
220 Lens assembly
230 Aperture
240 Split color filter
260 Image sensor
310 Capture image step
312 Captured image
320 Compute complementary images step
322 First complementary image
324 Second complementary image
330 Compute cross correlations step
340 Compute offset value step
342 Offset map
350 Generate full-color stereoscopic image pair step
352 Full-color stereoscopic image pair

The invention claimed is:

1. A system for generating a stereoscopic image pair comprising:
   a lens;
   a split color filter located at a stop associated with the lens having a first half with a first color filter and a second half with a second color filter, wherein the first color filter and the second color filter have complementary colors, the split color filter being configured to split an image of a scene formed by the lens into two complementary images having complementary colors;
   a color image sensor configured to simultaneously receive the two complementary images; and
   a data processing system configured at least to:
      compute an offset value for each corresponding pixel in the complementary images based at least upon an analysis of the complementary images; and
      generate a stereoscopic full color image pair based at least upon an analysis of the complementary images and the offset values.

2. The system of claim 1 wherein the analysis of the complementary images includes generating cross correlation information from the complementary images.

3. The system of claim 2 wherein the analysis of the complementary images includes generating the offset values from the cross correlation information.

4. The system of claim 1 wherein the complementary colors are red and cyan, blue and yellow, or upper and lower halves of a visible spectrum.

5. The system of claim 1 further comprising an image sensor including a color filter array, the color filter array including colors that match the complementary colors of the split color filter.

6. The system of claim 5 wherein the image sensor comprises a color filter array including red, green, blue and panchromatic pixels.

7. The system of claim 5 wherein the image sensor comprises a color filter array including red, blue, upper half of a visible spectrum and lower half of the visible spectrum pixels.

8. The system of claim 1 wherein the lens is a fixed focal length lens or a zoom lens.

9. The system of claim 1 wherein the data processing system is further configured at least to generate a range map based at least upon an analysis of the offset values.

10. The system of claim 1 wherein the data processing system is further configured at least to generate a monoscopic full color image or video based at least upon an analysis of the complementary images.

11. The system of claim 1 wherein the split color filter remains in the optical path during the capture of the complementary images.

12. The system of claim 1, wherein the analysis of the complementary images and the offset values to generate the stereoscopic full color image pair includes:
    generating a full-color right-side image of the stereoscopic pair at least by shifting image pixels from a first of the complementary images onto corresponding image pixels from a second of the complementary images using the offset values; and
    generating a full-color left-side image of the stereoscopic pair at least by shifting image pixels from the second of the complementary images onto corresponding image pixels from the first of the complementary images using the offset values.

13. A method of generating a stereoscopic image pair as captured comprising:
    capturing an image through a lens and a split color filter, the split color filter having a first half with a first color filter and a second half with a second color filter, wherein the first color filter and the second color filter have complementary colors, the split color filter being associated with the lens and being located at a stop of the lens, and being configured to split the image into two complementary images having complementary colors;
    computing an offset value for each corresponding pixel in the complementary images based at least upon an analysis of the complementary images; and
    generating a stereoscopic full color image pair based at least upon an analysis of the complementary images and the offset values.

14. The method of claim 13 wherein the analysis of the complementary images includes generating cross correlation information from the two complementary images.

15. The method of claim 14 wherein the analysis of the complementary images includes generating the offset values from the cross correlation information.

16. The method of claim 13, further comprising generating a monoscopic full color image or video based at least upon an analysis of the complementary images.

17. The method of claim 13 wherein one of the complementary images is formed by combining pixels captured with different photoresponses.

18. The method of claim 17 wherein green and blue pixels are combined to form cyan pixels, or green and red pixels are combined to form yellow pixels.

19. The method of claim 13 further comprising an image sensor including a color filter array, the color filter array including colors that match the complementary colors of the split color filter.

20. The method of claim 19 wherein the image sensor comprises a color filter array including red, blue, upper half of a visible spectrum and lower half of the visible spectrum pixels.

21. The method of claim 20 wherein color information for the full color image pair is provided by subtracting narrow spectral pixel values from wide spectral pixel values to produce red, green, and blue pixel values.

22. The method of claim 13 wherein the analysis of the complementary images includes a noise reduction algorithm.

23. The method of claim 13 wherein the generated full color stereoscopic image pair has red, green and blue color channels.

24. The method of claim 13 wherein the generated full color stereoscopic image pair has been interpolated at a same resolution as the complementary images.

25. The method of claim 13 wherein the analysis of the complementary images and the offset values to generate the stereoscopic full color image pair includes:
    generating a full-color right-side image of the stereoscopic pair at least by shifting image pixels from a first of the complementary images onto a corresponding image pixel from second of the complementary images using the offset values; and
    generating a full-color left-side image of the stereoscopic pair at least by shifting image pixels from the second of the complementary images onto corresponding image pixels from the first of the complementary images using the offset values.

* * * * *